United States Patent [19]

Eschenfelder et al.

[11] 4,048,010
[45] Sept. 13, 1977

[54] CONTROL ROD DRIVE FOR NUCLEAR REACTORS

[75] Inventors: Gunther Eschenfelder, Stockstadt; Rudiger Schultz, Offenbach, both of Germany

[73] Assignee: Kraftwerk Union Aktiengesellschaft, Mulheim (Ruhr), Germany

[21] Appl. No.: 656,896

[22] Filed: Feb. 10, 1976

[30] Foreign Application Priority Data

Feb. 11, 1975 Germany .................. 2505692

[51] Int. Cl.$^2$ .............................. G21C 7/12
[52] U.S. Cl. ........................ 176/36 R; 74/88
[58] Field of Search ............ 176/36; 74/1.5, 88, 74/89.15, 127, 128; 92/13.1, 13.4

[56] References Cited

U.S. PATENT DOCUMENTS

| | | | |
|---|---|---|---|
| 2,902,869 | 9/1959 | Wassel et al. | 74/88 |
| 3,031,397 | 4/1962 | Fortescue et al. | 176/36 R |
| 3,038,846 | 6/1962 | Yeomans et al. | 176/36 R |
| 3,050,943 | 8/1962 | Thorel et al. | 176/36 R |
| 3,088,902 | 5/1963 | Kumpf | 176/36 R |
| 3,364,120 | 1/1968 | Winders et al. | 176/36 R |
| 3,844,178 | 10/1974 | Gachot et al. | 74/128 |

*Primary Examiner*—Stephen C. Bentley
*Assistant Examiner*—S. A. Cangialosi

*Attorney, Agent, or Firm*—Herbert L. Lerner

[57] ABSTRACT

A nuclear reactor, a control rod drive for finely adjustable normal insertion and withdrawal of control rods from the reactor core, for scramming the control rods, as well as for locking the control rods in their respective rated position, the insertion being effected in a direction opposing the force of gravity, and the withdrawal being effected in direction of the force of gravity, includes a piston rod mounted so as to be displaceable in axial direction, the piston rod being couplable to respective control rods for driving the same, a threaded piston rotatably mounted on the axially displaceable piston rod, screw thread means supporting the threaded piston so that the piston is movable back and forth hydraulically, the screw thread means having controllable locking means for clearing the screw thread means stepwise in the back and forth direction so that the threaded piston is displaceable into and out of the reactor core stepwise to effect fine adjustment, the screw thread means, in condition of the control rod drive wherein the control rods are being scrammed, being clearable throughout by the locking means so that the piston rod entrains a respective control rod at a scram velocity that is increased in comparison to the velocity of the control rod during normal insertion thereof into the reactor core.

18 Claims, 14 Drawing Figures

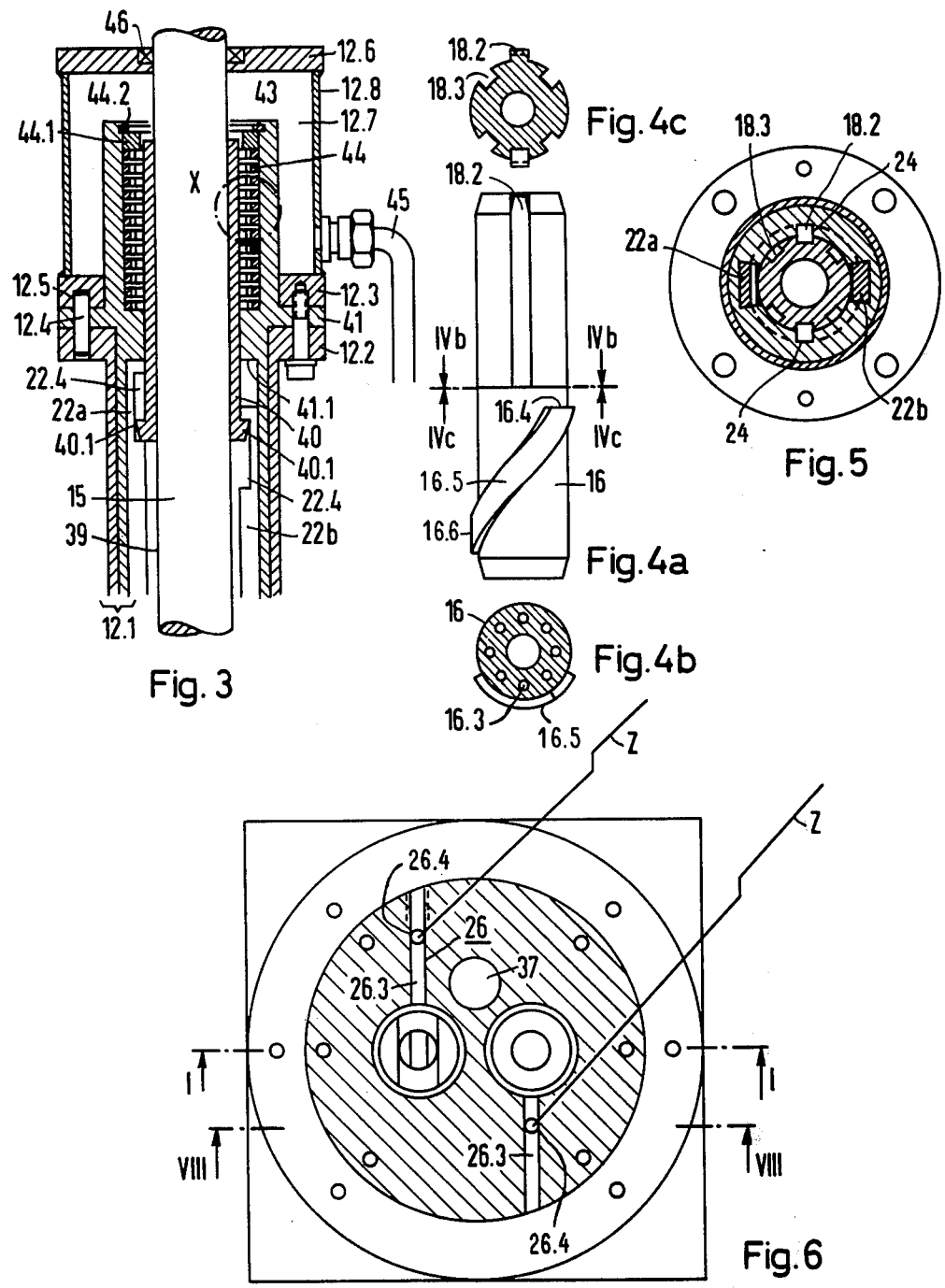

CONTROL ROD DRIVE FOR NUCLEAR REACTORS

The invention relates to a control rod drive for nuclear reactors and more particularly, to such a control rod drive located internally to the pressure vessel of a nuclear reactor, although it may also relate to such a control rod drive located externally to the pressure vessel. Various constructions of control rod drives for nuclear reactors are, of course, well-known. For one thing, they have as functions, adjusting reactor output power and controlling burn-up. For these purposes, adjustability of the rods in more-or-less finely graduated steps is necessary. For another thing, the control rods have the objective of shutting down the reactor in an emergency situation during which they must be shot very rapidly into the core.

It has been known heretofore to shoot the control rod into the core in a scram situation, by hydraulic or pneumatic means, driven by a hollow piston (German Pat. No. 1 169 596). However, a relatively complicated and expensive mechanical drive is required in this heretofore known case for inserting and withdrawing the control rod. Furthermore, this heretofore known drive is located completely below the base of the pressure vessel. This requires a large depth for assembly and disassembly. In addition, the diameter of the connecting piece or union at the pressure vessel, to which the drive is flanged, is relatively large. However, the thickness and accuracy of the control connection piece has a considerable effect on the time required to produce the reactor pressure vessels; in addition, the fabrication of the pressure vessel base becomes increasingly more difficult with increasing power rating i.e. with increasing quantity of control rods and stubs.

Attempts have been made heretofore to circumvent the foregoing difficulties by disposing the control rod drive at least partly within the pressure vessel (German Published Non-Prosecuted Applications DT-OS 1 964 119 and DT-OS2 007 771). However, a mechanical drive with a relatively large number of components and individual elements is used here for the drive to insert and withdraw the control rod which is a disadvantage, on the one hand, with respect to the space required in the pressure vessel and, on the other hand, in view of the required inspections of the parts and their maintenance.

It is accordingly an object of the invention to provide a control rod drive for nuclear reactors, especially internal to the pressure vessel but also possibly external thereto and, particularly, for water-cooled nuclear reactors, through which the aforedescribed difficulties of the heretofore known art are eliminated. In accordance with the other objects of the invention, the drive has, in particular, only a small number of drive elements, is of rugged construction and therefore is not trouble-prone and requires only little structural space or volume.

With the foregoing and other objects in view, there is provided in accordance with the invention, in a nuclear reactor, a control rod drive for finely adjustable normal insertion and withdrawal of control rods from the reactor core, for scarmming the control rods, as well as for locking the control rods in their respective rated position, the insertion being effected in a direction opposing the force of gravity, and the withdrawal being effected in direction of the force of gravity, comprising a piston rod mounted so as to be displaceable in axial direction, the piston rod being couplable to respective control rods for driving the same, a threaded piston rotatably mounted on the axially displaceable piston rod, screw thread means supporting the threaded piston so that the piston is movable back and forth hydraulically, the screw thread means having controllable locking means for clearing the screw thread means stepwise in the back and forth direction so that the threaded piston is displaceable into and out of the reactor core stepwise to effect fine adjustment, the screw thread means, in condition of the control rod drive wherein the control rods are being scrammed, being clearable throughout by the locking means so that the piston rod entrains a respective control rod at a scram velocity that is increased in comparison to the velocity of the control rod during normal insertion thereof into the reactor core.

In accordance with another feature of the invention, the control rod drive is disposed internally to the pressure vessel of the respective nuclear reactor.

The advantages obtainable with the invention are primarily apparent in that during insertion, only one switching step is effected by a pressure pulse which is applied below the piston rod, and also during withdrawal, only one switching step of the control rod is effected before the controllable locking means clear or release a further switching step. A high degree of safety is thereby provided against unintentional withdrawal of the control rod. The control rod drive has few and rugged parts which are not very sensitive to dirt, and the control rod drive can be of such construction that it can be disassembled from the top by means of the fuel element exchanging machine, a fact which facilitates inspection and maintenance considerably. The elimination of the outputs for the control rod drive tubes in the pressure vessel base has already been mentioned heretofore.

In accordance with a further feature of the invention, the threaded piston is supported with thread flanks disposed at the periphery thereof in corresponding threads of a fixed threaded bushing, the thread and threads having such a pitch that the threaded piston can turn in the threads rising due to an hydraulic pressure difference acting on the piston rod, or descending due to its own weight and that of the masses connected therewith, if the pressure is reduced; the threaded bushing having at the inner periphery thereof, axial guidance grooves which interrupt the threads and in which switching rods or bars are axially movably supported, the switching rods having recesses extending transversely thereto at a spacing from one another corresponding to the pitch of the screw thread and being of such axial length that the switching rods allow rotation of the threaded piston in the threads in a clear or release position when the recesses thereof are aligned with the screw threads, but block continued rotation of the threaded piston in a locking position if the recesses thereof are not aligned with the threads; and, for driving and controlling the switching rods, means are provided by which at least two switching rods can be brought alternatingly into the release or clear position and into the locking position in such a manner that the threads are cleared sequentially in time and serially in space only over a partial distance, and the threaded predetermined rotary angle units and partial strokes in the direction of insertion and withdrawal of the control rods.

In accordance with yet another feature of the invention, two switching rods are provided that are disposed in appropriate longitudinal grooves at diametrically opposite locations of the periphery of the threaded bushing, and the recesses of which are mutually offset according to the course of the threads. This embodiment is particularly advantageous from both a structural and functional standpoint, since it affords substantially symmetrical loading.

In accordance with an additional feature of the invention, the switching rods are capable of being brought into the release or clear position simultaneously in the event of an emergency shutdown (scram), so that the threaded piston is capable of traversing the entire stroke thereof without interruption, with threads clear or released throughout. The increased velocity for the scram condition is obtained through increased pressure of the hydraulic fluid, increased in comparison to the pressure for normal insertion. As is particularly advantageous, in accordance with an added feature of the invention, the reactor cooling water serves as the hydraulic fluid for driving or actuating the threaded piston and the scram piston, consequently, when the pressure of the reactor cooling water is about 70 atmospheres or bar, the pressure for operating the piston rod to insert the control rod is about 12 to 15 atmospheres or bar higher. The scram pressure is about 20 atmospheres or bar higher than the reactor cooling water pressure i.e. in absolute terms, about 90 atmospheres or bar.

To move the piston rod and, the control rod back and forth more precisely, in accordance with another feature of the invention, there is mounted on the piston rod; secured against relative rotation, respectively, a guide piston for the piston rod and thus, for the control rod; this guide piston is, in turn, guided by projections in axial grooves axially slidingly disposed at the inner periphery of the threaded bushing.

In accordance with yet a further feature of the invention, the switching rods are displaceable by hydraulic servo-pistons, two servo-pistons being controllable in respectively opposing directions for controlling insertion and withdrawl of the control rods in such a manner that, if one of the servo-pistons occupies the upper end position thereof, the other servo-piston is in the lower end position thereof. This embodiment of the invention has the advantage that three clearly delineated operating conditions are retainable which offer great safety in spite of the simplicity of the control:

1. If the hydraulic cylinders are vented and no pressure for insertion or scramming is applied to the piston rod, the switching rods automatically assume the locking position i.e. both of the switching rods so that double security is provided against withdrawal of the control rods;

2. only when scram pressure is applied do the switching rods go into the clear or release position thereof; and 3. for normal insertion or withdrawal, only one switching rod is unlocked.

Particular attention should be given to the construction of the thread flanks at the threaded piston, especially to the end faces thereof. Thus, in accordance with another feature of the invention, the thread flank of the threaded piston has an upper, substantially horizontal end face which runs against an upper, substantially horizontal stop surface of the respective switching rod recess when the thread is locked. An end face (impact surface) formed in such a manner has the advantage that it can lift both switching rods into the clear or release position as a stop surface for emergency shutdown, with the servo-piston hydraulically vented i.e. when the increased scram pressure is applied to the piston rod. On the other hand, it is particularly advantageous, in accordance with the invention, for the thread flank of the threaded piston to have a lower substantially vertical stop surface which, for stepwise downward movement of the threaded piston, runs against a corresponding lateral surface of the switching rod which is in the locking position. Thereby, self-locking is made possible for withdrawal of the control rods, which is effective also in the event that a line break should occur (note hereinbefore). The redundancy of the control rod drive for the case of an emergency shutdown is improved by the provision that a scram piston is disposed longitudinally movably on the upper end of the piston rod and engages with clutch dogs in one recess each at the upper ends of the switching rods in such a manner that the scram piston, if it is acted upon by the scram pressure, is movable upwardly to a stop and entrains the switching rods in the process into their clear or release position. In the scram condition, the clear or release by means of the upper stop surface of the threaded piston and/or by the scram piston takes place thereby, which also thereby results in double security.

As noted hereinbefore, another feature of the invention is also the use of the control rod drive described above as a so-called external control rod drive for nuclear reactors, since by that feature, a large number of the aforedescribed advantages are attainable.

Other features which are considered as characteristic for the invention are set forth in the appended claims.

Although the invention is illustrated and described herein as embodied in a control rod drive for nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of the specific embodiments when read in connection with the accompanying drawings, in which:

FIG. 3 is a vertical sectional view of the upper part of the control rod drive, of which the lower part was shown in FIG. 1;

FIG. 4a is a fragmentary elevational view of FIG. 1 showing the threaded piston and the guide piston;

FIG. 4b and 4c are cross-sectional views of FIG. 4a, respectively taken along the line IVb—IVb and IVc—IVc in the direction of the arrows;

FIG. 5 is a cross-sectional view of FIG. 1 taken along the line V—V in the direction of the arrows;

FIG. 6 is a cross-sectional view of FIG. 1 taken along the line VI—VI in the direction of the arrows;

Figure 11:
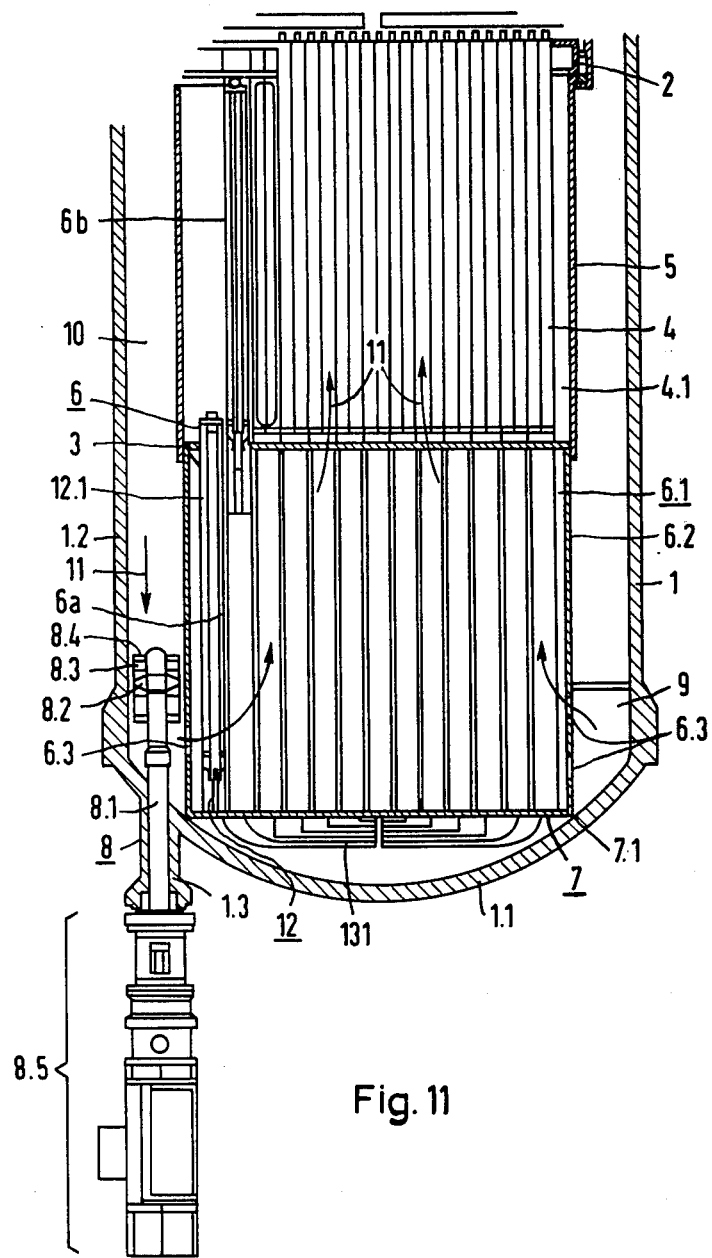
Figure 12:
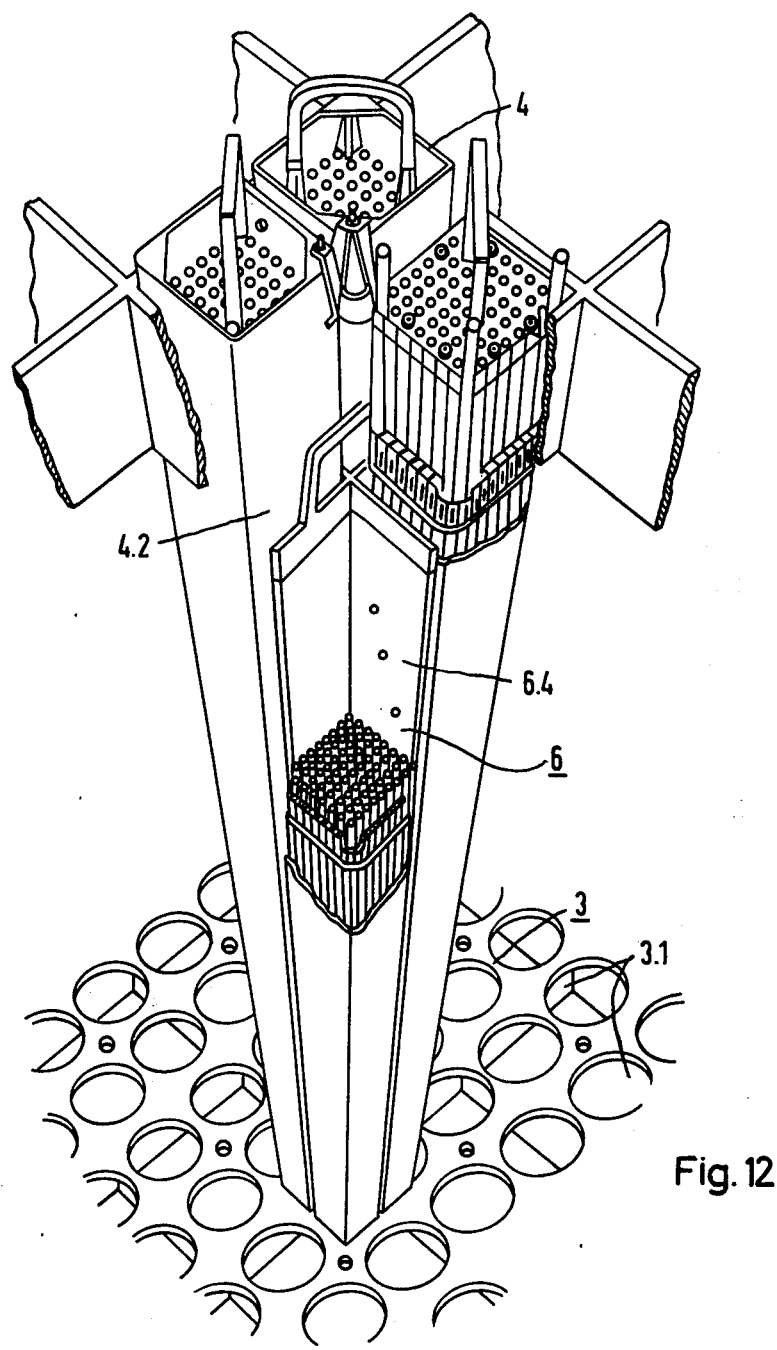

FIG. 11 is a diagrammatic vertical sectional view of the lower half of the pressure vessel of a boiling-water reactor showing the relationship of the control rod drive of the invention to the control rods and the dual elements of the reactors; and FIG. 12 is a perspective view of a core cell with four fuel elements disposed between the upper and the lower core support grid plates, and the absorber blades of a control rod disposed in a cruciform gap.

Referring now to the drawing and first, particularly, to FIG. 11 thereof, there is shown diagrammatically, a general view of the lower half of a pressure vessel 1 for a boiling-water reactor having an upper core support grid plate 2, a lower core support grid plate 3, and flue elements 4 which are inserted into the core support grid plates 2, 3 and are surrounded by a core shroud 5. Below the fuel element assembly 4.1 formed of the individual fuel elements 4, a control rod assembly 6.1 is disposed, formed of individual control rods 6. The control rod assembly 6.1 is supported on a lower base plate 7 which rests in turn by means of a flange 7.1 on the inside of the vessel bottom 1.1. The control rod assembly 6.1 is surrounded by a shroud 6.2 which, together with the core shroud 6.1, on the one hand, and the vessel wall 1.2, on the other hand, form an annular space which serves as the descent space 10 for the liquid reactor coolant, which is water, in the case at hand. In the lower portion of the descent space, there are regularly distributed over the circumference of the vessel 1, internal, axially disposed coolant pumps 8 having an impeller 8.2, mounted on a shaft 8.1 following or downstream of a vane ring 8.3 in flow directon of the coolant as shown by the arrow 11. The vane ring 8.3 is mounted at the inner periphery of an inlet channel 8.4. The shaft 8.1 of these axial pumps 8 sealingly extend through connecting pieces or unions 1.3 at the vessel bottom 1.1, the drive unit of the pump including cages, couplings, and the like, being generally designated by the reference numeral 8.5, the specific details thereof being of no importance for the invention of the instant application. The housing for the inlet channel 8.4, with guide vanes formed thereon, is fastened to a ring wall 9, which is in turn, secured between the vessel wall 1.2 and the shroud 6.2. The axial pumps 8 pump the coolant axially downwardly in the descent space in the direction of the arrow 11 and then force it through lateral input openings 6.3 into the guide grid of the control rod assembly 6.1, from which it travels axially upwardly through openings 3.1 (FIG. 12) in the lower core support grid plate 3 to cooling channels of the fuel element assembly 4.1. The steam-water mixture formed within the fuel element assembly 4.1 enters, above the fuel elements 4, into a plenum or collecting chamber, and from the latter into cyclones and after-connected steam driers, wherefrom it travels into the steam dome of the pressure vessel 1. From there, the steam is fed in conventional manner to steam turbines to perform work; the foregoing structures and devices last-mentioned without reference numerals are not shown in the drawing as they are not essential to the invention.

With each of the individual control rods 6, a control rod drive 12, only one of which is shown in FIG. 11, is associated. Hydraulic lines 131 for actuating these control rod drives 12 have a comparatively small diameter and are disposed below the base plate 7, the available space thereat being thus very well utilized, and extend to the outside through the pressure vessel base 1.1 at a non-illustrated location thereof. The control rod 6a is shown in withdrawn condition, while the control rod 6b is almost completely inserted. For the sake of greater clarity, the remaining control rod positions are left empty in FIG. 11 and are merely indicated by outlines and center lines. From FIG. 12, it is apparent that the four absorber blades 6.4 of an absorber rod, disposed in cruciform arrangement, can be driven up and down in the cruciform space 4.2 between the fuel element boxes 4, whereby the neutron flux distribution can be controlled depending upon the desired output of the reactor. The control rod drive 12, which will be described in greater detail hereinafter with reference to FIGS. 1 to 10, is therefore provided for finely adjustable insertion and withdrawal of the control rods 6, for rapid insertion (scram) as well as for locking the control rods in their respective intended or desired position. As can be seen from the figures of the drawing, the control rods are inserted against the force of gravity and are withdrawn in the direction in which the force of gravity acts. This is a displacement mechanism which finds application particularly for boiling-water reactors, even though it must be said that, in principle, the control rod drive 12 according to the invention is basically applicable also to pressurized-water reactors or other types of reactors.

Figure 1:
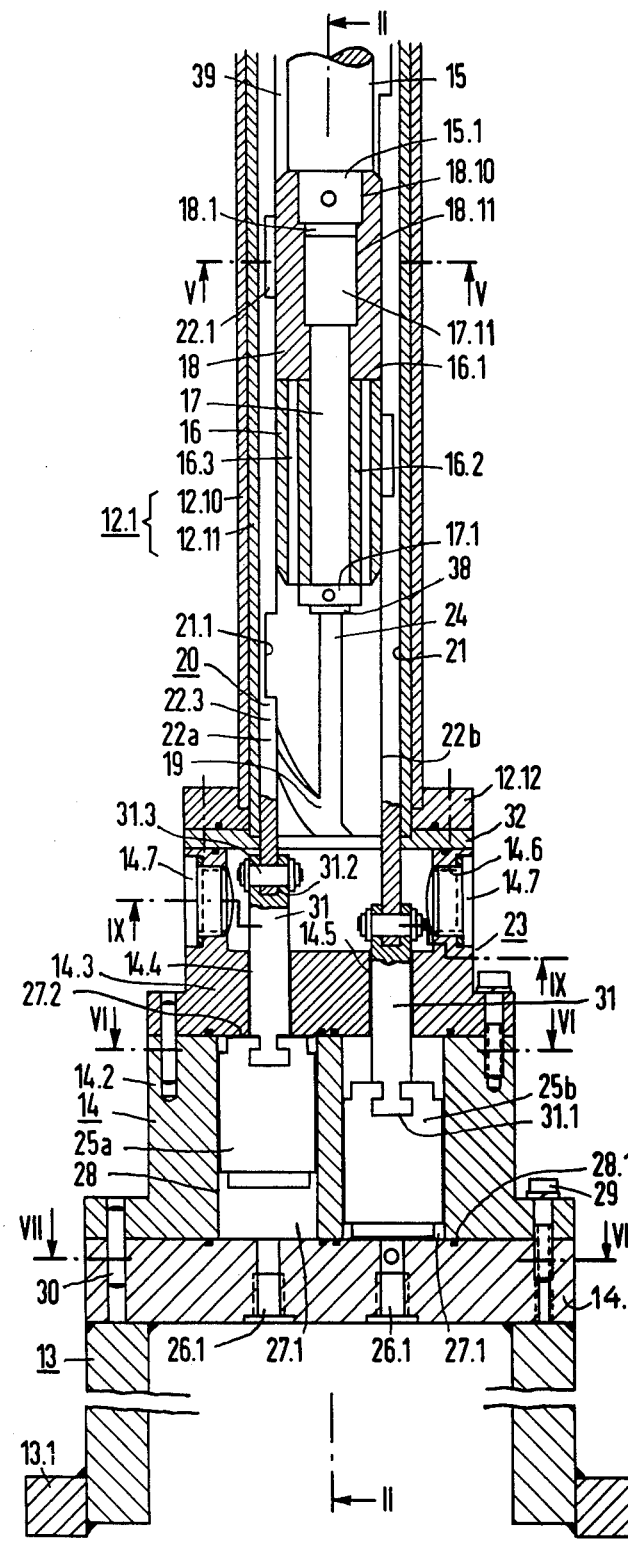
FIG. 1 is a vertical sectional view taken along the line I—I in hereinafter described FIG. 6 and showing the lower part of a control rod drive located internally to a pressure vessel of a nuclear reactor and constructed in accordance with the invention.
Figure 2:
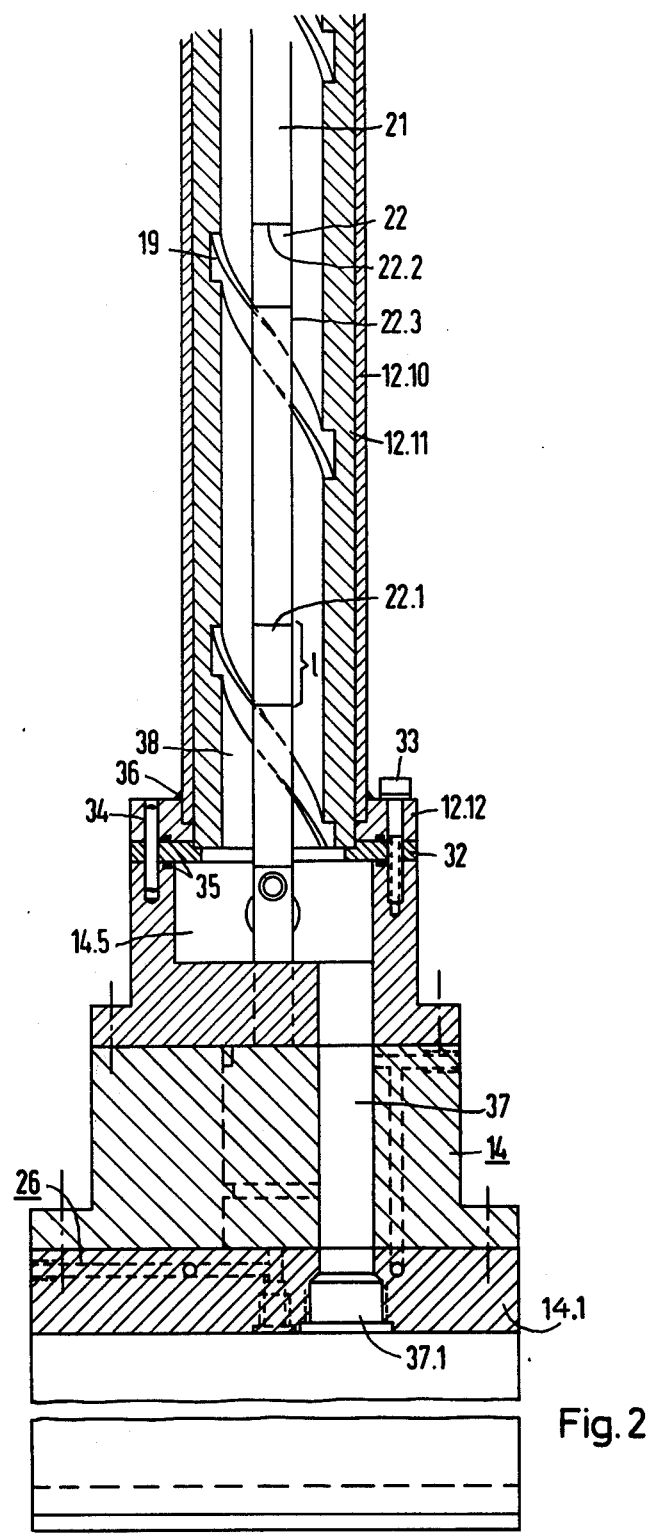
FIG. 2 is a longitudinal sectional view of FIG. 1 taken along the line II—II in the direction of the arrows.

Referring to the control rod 6a in FIG. 11, the control rod guide tube 12.1 therefor, though very small, can be readily seen therein and, as shown in detail in FIG. 1 or FIG. 2, is seen to be formed by an outer casing tube 12.10 and a threaded bushing 12.11 inserted into the former. In FIGS. 1 to 3, only a single control rod drive is shown; it being understood that a multiplicity of such drives is to be provided distributed over the base plate 7 (FIG. 11); each drive, respectively, having a foot or base part 13 formed with a flange 13.1 supported on the base plate 7 and secured to the latter. The flange 13.1 is welded to the foot part 13, and the latter, in turn, is welded to the base plate 14.1 of the control mechanism housing 14.

An axially displaceable piston rod 16 (FIGS. 1 and 3) is coupled to the respective control rod 6 (FIGS. 11 and 12) for driving the latter. The specific type of coupling does not form any part of the invention of the instant application.

It can be, in particular, a safety clutch for a nuclear reactor control rod such as descried in German Published Non-Prosecuted Application DT-OS 1 514 851 and DT-OS 2 155 832. The threaded piston 16 is rotatably mounted on the piston rod 15; specifically, it is rotatably mounted on the rod part 17 which has a shoulder 17.1 at the lower end thereof, as shown in FIG. 1, and it adjoins, with its upper end face 16.1, the corresponding end face of a guide position 18. The guide piston 18 is constructed as a hollow cylinder and is provided with a two-step central bore 18.1, the wider bore part 18.10 being coupled, fixed against relative rotation, with the reduced-diameter end 15.1 of the piston rod 15. The narrower bore part 18.11 surrounds a beefed-up or thicker end 17.11 of the coupling rod 17. Accordingly, the coupling rod 17 is insertable into the hole 18.1 from the top, as viewed in FIG. 1, during assembly. Thereafter, the threaded piston 16 can then be placed, with the central bore 16.2 thereof, on the rod part 17, and secured in the position thereof by the shoulder 17.1 which is pinned, as is also the upper end of the guide piston 18.

The threaded piston 16 is then mounted in threads 19 so that it is hydraulically displaceable upwardly and downwardly. The threads 19 are provided with controllable locking means, generally identified by the reference numberal 20, and are releasable or freely shiftable step-wise in upward and downward direction, so that the threaded piston 16 can be driven in and out stepwise for the fine adjustment of the control rod 6. On the other hand, the threads 19 with the locking means 20 can be cleared or freed all the way for the scram condition, so that the piston rod 15 entrains the control rod 6 at a scram velocity which is greater than the velocity for normal insertion. In particular, the threaded pistion 16 is supported for this purpose by thread flanks 16.5 (FIG. 4a) disposed at the outer periphery thereof in corresponding threads 19 of the fixed threaded bushing 12.11. The thread flanks 16.5 and the threads 19 have such a pitch that the threaded piston 16 can turn, rising in threads 19, due to a hydraulic pressure difference acting on the piston rod 15 or descending, if the pressure is released, due to its own weight and that of the masses 15, 18, 6 connected therewith. An advantageous pitch of the thread flanks 16.5 in this connection, is a pitch with which the threaded piston 16 executes a stroke of about 4 to 8 cm if it has turned in the threads 19 through the arc measure of the threaded flank 16.3 thereof, which covers about ⅓ of the circumference thereof. The threaded bushing 12.11, at the inner periphery thereof (note FIGS. 1 and 2), in particular, has axial guidance grooves 21, which interrupt the threads 19 and in which switching bars 22a and 22b are axially displaceably disposed. The switching bars 22a and 22b, at a spacing corresponding to the screw pitch, are provided with transversely extending recesses 22.1 of such axial length $l$ that the switching bars 22a and 22b render it possible, in a clear or free position, when the recesses 22.1 thereof are in alignment with the threads 19, for the threaded piston 16 to turn within the threads 19. In FIG. 1, the switching bar 22a on the left-hand side of the figure, has occupied this clear or free position. On the other hand, the switching bars 22 are so constructed and disposed that they, in a blocking position, when the recesses 22.1 thereof are not aligned with the threads 19, block further rotation of the threaded piston 16. Such a blocking position is assumed by the switching bar 22b at the right-hand side of FIG. 1. Means 23 for driving and controlling the switching bars are furthermore provided, through which at least two switching bars 22a and 22b can be brought alternatingly into the clear and into the blocking position in such a manner that the threads 19 are cleared or freed sequentially as to time and serially as to space only for a partial distance, and the threaded piston 16 is displaceable consequently stepwise through predetermined rotary angle units and partial or fractional strokes in the insertion or withdrawal direction.

It is particularly advantageous to provide, as shown, two switching bars 22a and 22b per control rod drive, which are, respectively, disposed in corresponding longitudinal slots 21 at two diametrically opposite locations of the periphery of the threaded bushing 12.11, the recesses 22.1 of the switching bars 22a and 22b being offset relative to one another in accordance with the shape of the threads 19, as is shown in FIG. 1 and 2. In principle it is also possible, however, to provide more than two switching bars, for example, four switching bars uniformly distributed over the periphery, whereby the partial or fractional strokes of the piston rod 15 are decreased correspondingly and, accordingly the control rod adjustment can be made finer yet. In case of an emergency shutdown (scram), the switching bars 22 can be brought simultaneously into the clear or release position, so that the threaded piston 16 can traverse, without interruption, the entire stroke thereof on threads 19 that are cleared or freed all the way, and the respective control rod 6 is displaceable ("slot") speedily into the inserted position thereof. In this case, the switching bar 22b in FIG. 1 has also assumed the position of the switching bar 22a opposite thereto. The hereinaforementioned guide piston 18 which is mounted, secured against relative rotation, on the piston rod 15, is guided, in its turn, with projections 18.2 in axial grooves 24 which are disposed at the inner periphery of the threaded bushing 12.11, so that it can slide axially. Precise guidance of the piston rod 15 and, thereby, of the control rod 6, is achieved thereby.

Figure 7:
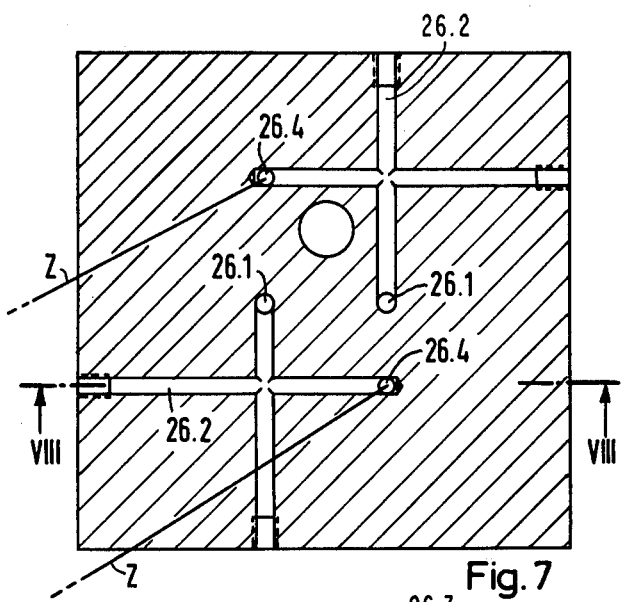
FIG. 7 is a cross-sectional view of FIG. 1 taken along the line VII—VII in the direction of the arrows.
Figure 8:
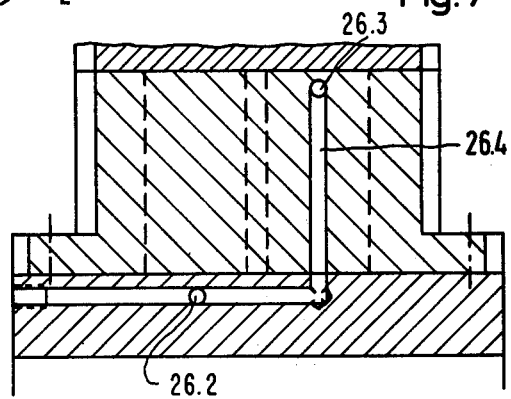
FIG. 8 is a cross-sectional view of FIG. 7 taken along the line VIII—VIII in the direction of the arrows.
Figure 9:
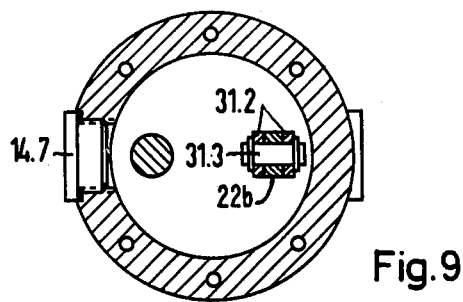
FIG. 9 is a cross-sectional view of FIG. 1 taken along the line IX—IX in the direction of the arrows.

The switching bars 22a, 22b are controlled by means of hydraulic servo-pistons 25a, 25b respectively being provided for each switching bar 22a, 22b for the purposes of insertion and withdrawal control, the servo-pistons 25a, 25b being controllable in opposite directions so that, if one servo-piston occupies the upper end position thereof (in FIG. 1, this is the piston 25a), the other is in the lower end position thereof (in FIG. 1, this is the piston 25b). Particularly advantageous is a mutual hydraulic interlock of the pistons 25a and 25b by means of bypass lines generally designated by the reference numeral 26, as shown in the illustrated embodiment, the cylinder chambers 27.1 of the pistons 25a and 25b, associated with the underside of the pistons, always being connected, respectively, with the other piston's cylinder chamber 27.2 associated with the top side of the piston, in such a manner that, upon admission of the pressure to the underside of the piston and upward displacement of the respective piston, the other piston is forcibly displaced downwardly as pressure is admitted to the top side thereof. In FIG. 1, the underside of the piston 25a was subjected to the pressure oil, so that this piston 25a was driven into the upper end position thereof, and, through the bypass lines 26, the top side of the piston 25b had been acted upon simultaneously, so that this piston 25b was displaced into the lower end position shown. The pressure oil is fed to the cylinder chambers 27.1 through respective connecting bores 26.1 which are formed in the base plate 14.1 and serve for connecting suitable hydraulic pressure tubing (not shown). The base plate 14.1 is clamped and doweled (bolt 29, dowel pin 30) to the housing body 14.2 (which contains the cylinder bores 28) and the latter, in turn, with the cover plate 14.3, sealed through the inter-position of suitable sealing rings 28.1. The bypass lines 26 are formed of lower horizontal line sections 26.2 (FIG. 7) and upper horizontal line sections 26.3 (FIG. 6) as well as of vertical line sections 26.4 (FIGS. 6 to 8). The lines z serve to clarify the identity of the vertical bypass line sections 26.4 in FIGS. 6 and 7. The pistons 25a and 25b are coupled with their switching bars 22a and 22b through push rods 31, having a hammerhead-like end 31.1 on one side thereof with which they engage the pistons, and having a fork-shaped end 31.2 at the other side thereof with which they are linked to the lower end of the switching bars 22a and 22b, (by a coupling pin 31.3, see also FIG. 9). The push rods 31 have a circular cross section and are guided slidingly in axial direction in corresponding bores 14.4 formed in the cover plate 14.3. The cover plate 14.3 of the hydraulic drive forms, at the upper side thereof, a chamber 14.5, which is accessible through lateral bores 14.6 into which threaded plugs 14.7 are screwed for sealing, so that one can get to the coupling locations 31, 31.2, 31.3 for assembly or disassembly as well as for inspection. At the upper side of the cover 14.3, an intermediate plate 32 is sealingly disposed and, on the latter, in turn, the flange 12.12 of the control rod guide tube 12.1 is sealingly seated (clamping bolt 33, dowel pins 34, seals 35, welded seam 36).

Through the housing 14 i.e. the base plate 14.1, the shell or casing 14.2 and the cover 14.3, a scram line 37 (note especially FIG. 2) extends into the chamber 14.5. The scram line 37 has a threaded bore 37.1, into which the respective connecting piece of a non-illustrated pressure line for the pressure fluid can be screwed. The reactor cooling water preferably serves as the pressure fluid since, in that case, the pressure fluid can pass into the cooling system of the reactor without having to provide seals for two separate circulatory loops. The pressure fluid then flows through the chamber 14.5 into the lower pressure chamber 38, which is provided within the control rod guide tube 12.1 and which communicates with the upper pressure chamber 39 (at the upper side of the piston assembly 16, 18) not only through the threads 19 but also through the axial bores 16.3 of the threaded piston 16 and through the axial grooves 18.3 of the guidance piston 18. The bores 16.3 therefore serve as outgoing and return flow openings for the pressure fluid when inserting and withdrawing the control rod 6. From FIG. 5, the switching 22a, 22b, the axial grooves 18.3, as well as the guide projections 18.2 can again be seen clearly. As shown especially in FIG. 4a, the thread flank 16.5 of the threaded piston 16 has an upper, substantially horizontal end face 16.4 which, when the thread is blocked, runs against an upper, substantially horizontal stop surface 22.2 (FIG. 2) of the respective switching-rod recess 22.1. At the other end, the thread flank 16.5 of the threaded piston 16 has a substantially vertically extending stop surface 16.5 (FIG. 4a) which, during stepwise downward displacement of the threaded piston 16, runs against a respective lateral surface 22.3 of the switching bar 22 which is in the blocking position. With the upper horizontal end face 16.4, the threaded piston 16 is then in a position, during emergency shutdown and when the servo-pistons 25a, 25b are hydraulically vented, to lift both switching bars 22a and 22b into the release or clear position i.e. if the increased scram pressure is supplied through the line 37, whereas with normal insertion pressure, the threaded piston 16 can be released only step-by-step and, in fact, as long as the pressure remains.

So that double security may be provided in case of an emergency shutdown, a further, separate scram piston 40 is longitudinally displaceably mounted at the upper end of the piston rod 15 (FIG. 3) which engages through clutch dogs 40.1 with a respective recess 22.4 at the upper ends of the switching bars 22a, 22b in such a manner that the scram piston 40 can be driven upwardly to a stop when acted upon by scram pressure and, in the process, entrains both switching bars 22a, 22b to the release or clear position thereof. In the illustrated embodiment of the invention, the stop is provided by the end face 41.1 of the labyrinth seal housing 41, against which the switching bars 22a and 22b engage in the upper end position thereof (note switching bar 22a).

Between the scram piston 40 and the piston rod 15, a defined annular gap 42 is disposed for the pressure fluid or the hydraulic fluid to pass through from the upper pressure chamber 39 to a counterpressure side 43 of the hydraulic loop, the leakage rate of the annular gap 42 determining the falling velocity of the piston rod 15 and of the threaded piston 16 and, consequently, that of the control rod in the event of withdrawal. The scram piston 40 and, accordingly, indirectly, also the piston rod 15 is centrally supported with the outer periphery thereof in a labyrinth seal packing 44. This seal packing 44 serves to provide a centering support, which, however, allows a certain amount of lateral deviation for the piston rod and, of course, also sealing of the outer periphery of the scram piston 40, since a defined amount of leakage should pass through the sealing gap 42. The seal packing 44 surrounds the scram piston 40 concentrically and coaxially and is fixed at the upper end face thereof by a holding ring 44.1 and a snap ring 44.2, the snap ring being inserted into a corresponding circular groove at the inner periphery of the seal housing 41. The seal housing 41 is sealingly clamped to the upper flange 12.2 of the guide tube 12.1 (bolt 12.3, doel pins 12.4), a counterring 12.5 being provided further as a support. The upper plate 12.5 must be firmly connected in a non-illustrated suitable manner to the lower core grid plate (FIG. 11); in the case shown in FIG. 3, the upper plate 12.5 serves as the base plate for the housing 12.6 of a sealing chamber 12.7, which serves, during a test setup, to test the drive when the control rod drive is not yet installed in the reactor pressure vessel, the pressure fluid being not conducted in this case into the reactor but being returned to the hydraulic loop through the outlet 45, which is connected to the housing shell or casing 12.8. Accordingly, a seal packing 46 is also provided in the cover plate 12.6 for sealing the piston rod 15 from the outside.

Chrome-nickel or stainless steels, which are known and proven in practice, are employable as material for the aforedescribed control rod drive; on the parts which are heavily stressed by the reciprocating motion, such as the pistons 25a, 25b and the push rods 31, it is advisable to provide a molybdenum layer, for example, 0.3mm thick. Molybdenum exhibits excellent sliding properties with steel St 4550 and virtually no wear after a period of use or dwelling time in reactor. Steel of the type ST 4571, which exhibits the required hardness, was used for the scram piston 40.

Figure 10:
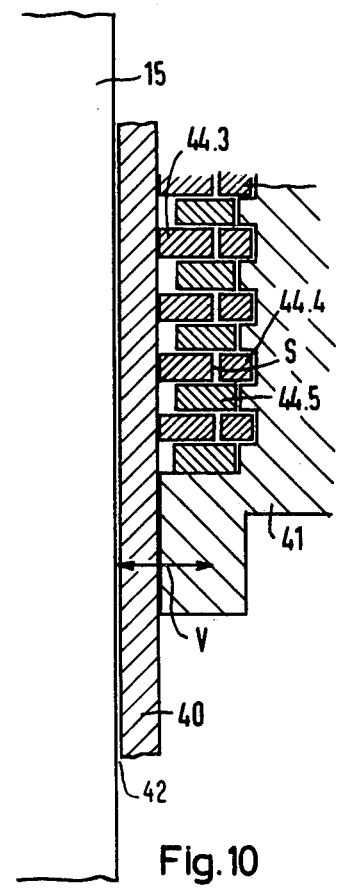
FIG. 10 is an enlarged fragmentary view of FIG. 3 showing details of the encircled region X which includes parts of the labyrinth sealing ring package.

A detail X of the labyrinth seal packing can be seen in FIG. 10. The sealing rings 44.3, which surround the scram piston 40, can yield laterally in both directions, as indicated by the arrow, V, since these rings 44.3 have a radial gap S opposite the spacer rings 44.4 which are disposed fixed in circular grooves formed in the housing 41. On one layer of sealing rings 44.3 and 44.4, in the manner of bonded brick, there is a respective layer of a single sealing ring 44.5, which covers up the seal gap S yet has enough radial play relative to the scram piston 40 on the one hand and the housing 41 on the other hand. The sealing rings 44.3 may further be provided in the gap S with elastic spring elements e.g. leaf springs, which generate a slight restoring force, so that the sealing rings 44.3 always maintain a defined position. It is important for the labyrinth seal ring packing to be able to yield elastically in lateral direction and thus form an elastic guide for the scram piston 40 and the piston rod 15, so that jamming due to increased contact pressure cannot occur if the scram piston moves axially, and the ring packet, of course, has the required sealing effect at the outer periphery of the scram piston 40.

The operation of the aforedescribed control rod drive is as follows: In FIG. 1, the threaded piston 16 and thereby, the piston rod 15 with the control rod 6 is locked by the switching bar 22b, which is the lower end position thereof. If the threaded piston 16 should run upwardly another switching step, then pressure is applied to the underside of the piston 25b, so that this piston 25b is displaced with its switching bar 22b upwardly into the upper end position thereof and, simultaneously, the other piston 25a is displaced into the lower end position thereof. Since the pressure fluid is fed-in through the scram line 37 with the pressure required for withdrawal of, for example, 12 to 15 bar excess pressure over the pressure prevailing in the space 43, the piston rod 15 at the effective area of which the pressure difference is transformed into an upward force, will turn the threaded piston in the thread 19 upwardly by one switching step, until the threaded piston is driven with the upper stop surface 16.4 thereof against the upper locking surface 22.2 of the left-hand switching bar 22a, which is now in the locking position. By alternatingly switching the servo-pistons 25, this cycle can be repeated until the piston rod and the control rod are driven into the upper end position thereof. For withdrawal, of course, the insertion pressure is not applied through the scram line 37, so that in the space below the labyrinth seal packing 44, no higher pressure prevails than in the space 43. The piston rod 15 and therewith, the threaded piston are therefrom displaced downwardly by the force of gravity, the leakage rate of the annular gap 42 determining the rate of fall, but only to the extent that the control bars 22a, 22b permit stepwise operation. By alternatingly switching the servo-pistons 25a, 25b the control rod can therefore be moved again stepwise into the lower (withdrawn) end position thereof. In withdrawing, the thread flank 16.5 of the threaded piston 16 runs with the lower end face 16.6 thereof against the respective lateral surface 22.3 of the switching bar 22a which is then in the locking position. The threaded piston 16, the piston rod 15 and, thus, the control rod 6 can therefore be locked and held in any desired position within the step sequence during insertion as well as during withdrawal, even if pressure is applied through the scram line 37 (except, of course, the higher scram pressure). If, for any reason, the pressure oil for the servo-pistons 25a, 25b should fail, for example, due to a line break, then both servo-pistons 25a, 25b and, therefore, their switching bars 22a, 22b, go into the lower end position, so that the two switching bars 22a, 22b are in the locking positions, whereby the control is doubly locked against withdrawal. In an emergency shutdown situation (scram) the scram pressure, which is about 20 atmospheres or bar higher than the counterpressure and, with a pressure of 70 atmospheres or bar in the reactor pressure vessel, has a pressure of about 90 atmospheres or bar, is applied through the scram line 37. With this increased pressure, the force at the piston rod 15 is so large that the threaded piston 16 can entrain, with its upper end face 16.4, which serves as an impact surface, the switching bar which is just then in the locking position, into its release or clear position. In the scram situation, the servo-pistons are, of course, hydraulically vented, so that the scram mechanism can proceed. The hereinbefore described scram piston 40, however, also moves the two switching bars 22a, 22b into their clear or release position so that double security is provided in the scram situation in the sense that, in every case, the thread is cleared or released all the way along the entire length thereof and the piston rod 15 can be driven upwardly at scram velocity, which is at least 1 m/sec, but normally even higher, about 2 m/sec, and thereby, the control rod 6 can be shot into the fuel element assembly. If the control rod is fully inserted, then a pressure pulse on the control mechanism will bring one of the switching bars into the locking position thereof, namely that switching bar which fixes the upper end position of the threaded piston.

It should further be emphasized as a special advantage that the control rod drive according to the invention is also suited to be disassembled from the reactor pressure vessel by means of the refueling machine i.e. from the top. The mechanism of the control rod drive is so rugged and the operation so reliable, that the use of the control rod drive is advisable not only inside the pressure vessel, but it can find use also in such reactor structures where the essential control rod drive parts are disposed externally to the pressure vessel.

We claim:

1. In a nuclear reactor, an hydraulic control rod drive comprising a vertically disposed tube, a piston rod mounted in said tube so as to be axially displaceable therein, means for hydraulically driving said piston rod in axial direction in said tube, means located at the upper end of said piston rod for coupling a control rod to said piston, and means for controllably blocking axial displacement of said piston rod in said tube, said blocking means being ineffective during rapid shut-down of the nuclear reactor, said blocking means comprising a threaded piston rotatably mounted on said piston rod and fixed thereon against axial displacement relative thereto, said threaded piston having a thread flank located at the outer periphery thereof, said vertically disposed tube being formed with an inner thread corresponding to said thread flank, said thread flank being received in said thread, said hydraulically driving means comprising at least two hydraulically controlled, axially displaceable switching rods mounted in axial guidance grooves formed at the inner perihery of said vertically disposed tube and interrupting said thread, said switching rods, in a clear position thereof, permitting rotary movement of said threaded piston and, in a locking position thereof, forming a stop for said thread flank and blocking rotary movement of said threaded piston, said switch rods being hydraulically controlled so as to be displaceable stepwise in axial direction during normal operation of the control rod drive.

2. In a nuclear reactor according to claim 1 wherein said control rod drive is disposed in the pressure vessel of the reactor.

3. Control rod drive according to claim 1 wherein said thread flanks and said threads have such a pitch that the threaded piston is turnable in said threads, rising in response to an hydraulic pressure difference acting on said piston rod, and descending in response to release of pressure and due to its own weight and the weight of masses connected therewith, said switching rods being formed with recesses extending transversely thereto at mutual spacing corresponding to the pitch of said screw thread means and being of such an axial length that said switching rods afford rotation of said threaded piston in said threads in said clear position when said recesses thereof are aligned with said screw thread means but block continued rotation of said threaded piston in said locking position when said recesses thereof are not aligned with said threads, at least two of said switching rods being alternatively shiftable into clear position and into locking position in such a manner that said threads are cleared sequentially in time and serially in space only over a partial distance, said threaded piston being accordingly displaceable stepwise through predetermined rotary angle units and partial strokes in direction of insertion and withdrawal of the control rods.

4. Control drive according to claim 3 wherein said switching rods are two in number, said switching rods being mounted in said axial guidance grooves, respectively at two mutually diametrically opposing locations of the periphery of said threaded bushing, said recesses thereof being mutually offset in accordance with the course of said threads.

5. Control drive according to claim 3 wherein, upon occurrence of a scram condition, said switching rods are adjustable into clear position simultaneously so that said threaded piston is capable of traversing the entire stroke thereof without interruption, with said threads clear throughout.

6. Control drive according to claim 3 including a guide piston for said piston rod and thus for the control rod mounted on said piston rod and secured against relative rotation therewith, said guide piston having projections for guiding said guide piston, in turn, said projection being axially slidingly disposed in axial grooves formed at the inner periphery of said threaded bushing.

7. Control drive according to claim 3 including at least two hydraulic servo-pistons for displacing said switch rods, said two servo-pistons being controllable in respectively opposite directions for controlling insertion and withdrawal of the control rods so that when one of said servo-pistons occupies the upper end position thereof, the other of said servo-pistons is in the lower end position thereof.

8. Control device according to claim 7 comprising a mutual hydraulic interlock of said servo-pistons including bypass lines connecting cylinder chambers located at the underside of each of said servo-pistons to an associated cylinder chamber located at the upperside of the other of said servo-pistons so that, upon admission of pressure to the underside of one of said servo-pistons and upward displacement of the respective piston, the other of said pistons is forcibly displaced downwardly as pressure is admitted to the upper side thereof.

9. Control device according to claim 7 including push rods coupling said servo-pistons to the respective switching rods.

10. Control device according to claim 3 wherein said thread flanks of said threaded piston has an upper substantially horizontal end face, said horizontal end face, in blocked condition of said thread, running against an upper, substantially horizontal stop surface of the respective recess formed in said switching rod.

11. Control device according to claim 10 wherein, in scram condition, and hydraulically vented condition of said servo-pistons, both of said switching rods are liftable into said clear position by means of said upper, substantially horizontal end face of said thread flanks.

12. Control device according to claim 11 wherein a scram piston is disposed longitudinally movable on the upper end of said piston rod, clutch dogs engageable with said scram piston in a respective recess at the upper ends of said switching rods so that said scram piston, when subjected to scram pressure, is movable upwardly to a stop and entrains both of said switching rods into their clear position.

13. Control device according to claim 12, wherein said scram piston and said piston rod define therebetween an annular gap for passing therethrough hydraulic fluid from a pressure side to a counter pressure side of an hydraulic loop, the leakage rate of said annular gap determining the falling velocity of said piston rod and of said threaded piston and thereby that of said control rod in the condition wherein the control rods are withdrawn.

14. Control drive according to claim 13, wherein said scram piston is centrally supported with the outer periphery thereof in a labyrinth-seal packing.

15. Control drive according to claim 14 wherein the reactor coolant water serves as hydraulic fluid for driving said piston rod and said scram piston.

16. Control device according to claim 15 wherein said threaded piston and said guidance piston are formed with axial bores and grooves, respectively, for conducting pressure fluid therethrough, said axial bores and grooves serving as outgoing and return flow openings.

17. Control device according to claim 3 wherein said thread flank of said threaded piston has a lower, substantially vertically extending stop surface which, during stepwise downward displacement of said threaded piston, runs against a respective lateral surface of the switching bar which is in blocking position.

18. In a nuclear reactor according to claim 1 wherein said control drive is located externally to the reactor vessel of the reactor.

* * * * *